United States Patent [19]

Sugioka et al.

[11] Patent Number: 4,575,015

[45] Date of Patent: Mar. 11, 1986

[54] FLUID COUPLING DEVICE

[75] Inventors: Takami Sugioka; Takeshi Tanaka, both of Ehime, Japan

[73] Assignee: Teijin Seiki Company Limited, Osaka, Japan

[21] Appl. No.: 713,665

[22] Filed: Mar. 19, 1985

[30] Foreign Application Priority Data

Mar. 19, 1984 [JP] Japan .............................. 59-38094[U]

[51] Int. Cl.[4] ......................................... B65H 54/547
[52] U.S. Cl. .................................. 242/46.4; 277/167.5; 464/18; 464/73
[58] Field of Search ................... 242/46.4, 46.2, 46.3, 242/46.6, 130, 72 R, 72 B, 72.1, 68.2; 277/167.5, 167.3, DIG. 8; 285/95, 369; 464/18, 73, 92, 94, 96, 98

[56] References Cited

U.S. PATENT DOCUMENTS

| 101,488 | 4/1870 | Mendham | 277/167.5 |
| 2,135,634 | 11/1938 | Byrom | 464/73 |
| 2,719,412 | 10/1955 | Croset | 464/73 |
| 3,217,922 | 11/1965 | Glasgow | 277/167.5 X |
| 3,396,556 | 8/1968 | Giegerich | 464/73 |
| 3,495,781 | 2/1970 | Graf et al. | 242/46.4 |
| 3,554,455 | 1/1971 | Graf | 242/46.4 |
| 3,884,049 | 5/1975 | Pauli | 464/73 |
| 3,977,616 | 8/1976 | Owens et al. | 242/46.4 |
| 4,384,728 | 5/1983 | Koltookian | 277/167.5 |
| 4,458,850 | 7/1984 | Sugioka et al. | 242/46.4 |

FOREIGN PATENT DOCUMENTS

| 1352 | 1/1977 | Japan | 464/73 |
| 115552 | 9/1980 | Japan | 242/46.4 |

Primary Examiner—Stanley N. Gilreath
Attorney, Agent, or Firm—Sughrue, Mion, Zinn, Macpeak, and Seas

[57] ABSTRACT

A thread bobbin holder device having improved sealing between shafts, and consequently less bearing wear. The bobbin holder device is constituted by a bobbin holder body with a bobbin fitted on the outer circumference thereof through a bobbin holder member. A piston controlling the amount of tension between the bobbin and the bobbin holder member is provided inside the bobbin holder body. A holder shaft and a second shaft are provided, both of which have a longitudinal throughhole formed therein. A support body rotatably supports the bobbin holder body. A shaft joint connects the holder shaft and the second shaft. A tubular elastic member is disposed in the shaft joint and is fitted into respective end portions of the holder shaft and the second shaft.

4 Claims, 8 Drawing Figures

FLUID COUPLING DEVICE

BACKGROUND OF THE INVENTION

The present invention relates to a bobbin holder device for coiling and feeding thread.

A conventional bobbin holder device is constructed as shown in cross-section in FIG. 1. In FIG. 1, reference numeral 1 designates a driving motor; 11, a bearing in the motor; 3, a holder shaft; 31, a driving shaft; and 33, a middle shaft. The shafts are connected through shaft joints 32 and 32'. Reference numeral 2 designates a support body. A screw 34 is engaged with a nut 35 at the end of the shaft so that the shaft 3 and a bobbin holder body 4 are connected with each other. Reference numeral 36 designates a bearing; 37, a stop ring for the bearing; 5, a piston in the bobbin holder body 4; 51, an O-ring; 52, a cap covering the end of the holder body 4; 53, a spring; 54, a spacer; 55, a stop ring; 56, a screw at the end of the extending portion of the piston; 57, a nut; 42, a sleeve; 43, a bobbin holding member composed of an elastic ring; and 6, a bobbin.

In the thus-arranged conventional bobbin holder device, the nut 57 is screwed onto the screw 56 so that the cap 52 and the piston 5 are fixed to each other and pulled rightwardly in the drawing by the spring 53 to push the sleeve 42 rightwardly to thereby press this assembly against the bobbin holder body 4. The bobbin holding member 43 is pressed from opposite directions to expand outwardly to thus press against the bobbin 6 on the outside to thereby fix the bobbin 6 to the bobbin body 4. When the holder shaft 3 is driven by the motor 1, the bobbin holder body 4 fixed by the nut 35 rotates together with the shaft and the bobbin 6 rotates through the bobbin holding member 43 so as to perform, for example, thread coiling or feeding.

To remove or exchange the bobbin 6, pressurized air is supplied into the space 41 to force the piston 5 leftwardly in the drawing against the spring 53. The cap 52 also moves leftwardly, loosening the bobbin holding member 43, whereupon the bobbin 6 can be removed.

More specifically, pressurized air is fed from an air source (not shown) through an inlet hole 21 formed in the support body 2. The pressurized air enters a first chamber 26, flows through a passage 23 through a hole 22, and then enters the space 41 through a passage 23'. The passage 23 and a second chamber 27 between the bearings 36 and 36 are communicated with each other through a hole 22'. The piston 24 and a rubber ring 25 on the end of the piston 24 are provided for maintaining in airtight fit between the support body 2 and the rotating bobbin holder body 4. The piston 24 is pressed from the rear in the drawing so as to press against the rubber ring 25 to maintain the seal.

In such a conventional arrangement, although the first and second chambers should be at the same pressure, a pressure difference may occur due to a lack of a good seal. Because such a pressure difference can give rise to a flow from the outside containing dust, thread waste, or other contaminants, the service life of the bearing tends to be short. Also, such a flow can cause a loss of lubricant, further tending to shorten the bearing life.

In an attempt to alleviate these problems in the bobbin holder device, an arrangement as shown in FIG. 2 has been proposed. In FIG. 2, the bobbin portion has the same structure as that in FIG. 1, and the same reference numerals as those used in FIG. 1 designate the same parts. The two arrangements differ, however, in how pressurized air is fed to the space 41. The pressurized air in the case of FIG. 2 flows from right to left in the drawing through a hole 30 formed in each of the driving shaft 31, the middle shaft 33, and the holder shaft 3. In this case, it is necessary to conduct the pressurized air through the shaft joints 32 and 32'.

An object of the present invention is to provide a fluid coupling device in such a case where the fluid flows through passages formed through a pair of shafts with a fluid coupling device being provided to conduct the fluid between the shafts. More particularly, it is an object of the invention to provide a fluid coupling device for use in a thread bobbin holder device having a simple structure but which conducts fluid between two shafts in an airtight manner.

SUMMARY OF THE INVENTION

These as well as other objects of the invention are met by a bobbin holder device comprising a bobbin holder body having a bobbin fitted on an outer circumference thereof through a bobbin holder member, a piston provided inside the bobbin holder body for controlling an amount of tension between said bobbin and said bobbin holding member, a holder shaft, a support body for rotatably supporting the bobbin holder body, a second shaft rotated by a driving source with through-holes being formed in both the holder shaft and the second shaft, a shaft joint connecting the holder shaft in the second shaft, and a tubular elastic member disposed in the shaft joint and fitted into respective end portions of the holder shaft and the second shaft. If desired, the shaft joint can be constituted by a pair of flanges and an elastic buffer body sandwitched between the pair of flanges. The elastic buffer body and the tubular elastic member may be formed integrally with one another.

BRIEF DESCRIPTION OF THE DRAWINGS

FIG. 6 is a perspective view showing a buffer body; and and

DESCRIPTION OF THE PREFERRED EMBODIMENTS

Figure 3:
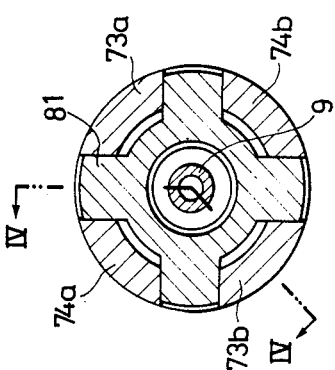
FIG. 3 is a longitudinal cross-sectional view of a fluid connecting device according to the present invention.
Figure 1:
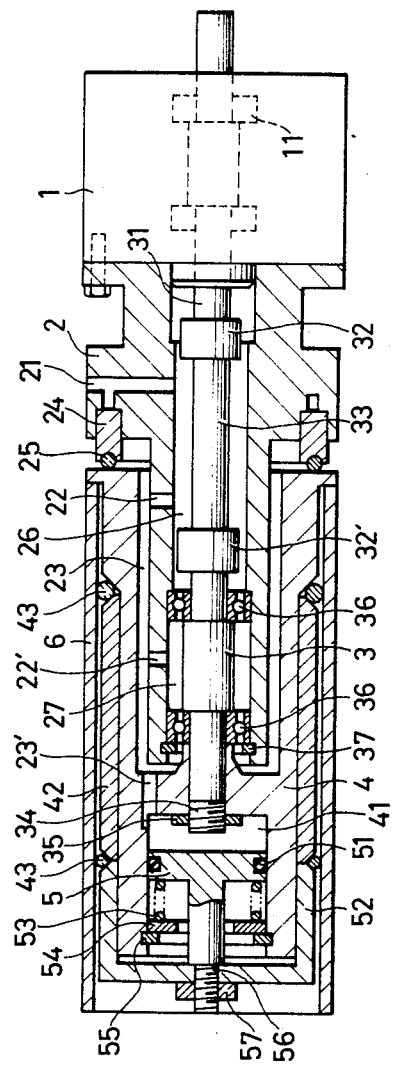
FIG. 1 is a side cross-sectional view of a conventional bobbin holder device.
Figure 2:
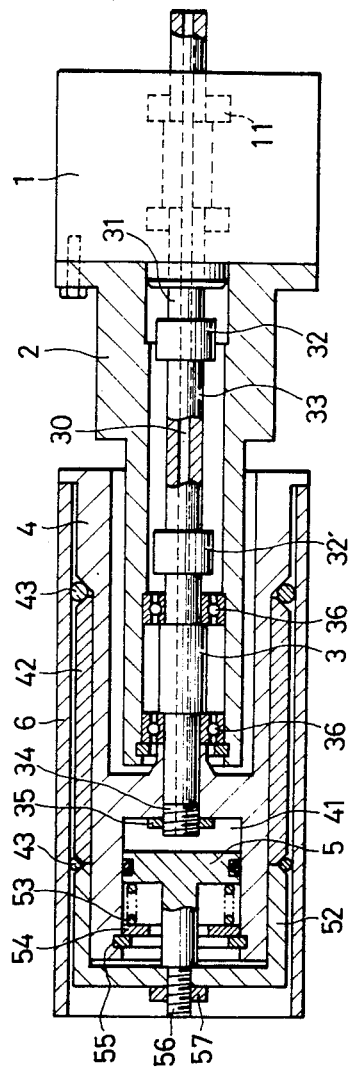
FIG. 2 is a side cross-sectional view of an improved conventional holder device.
Figure 4A:
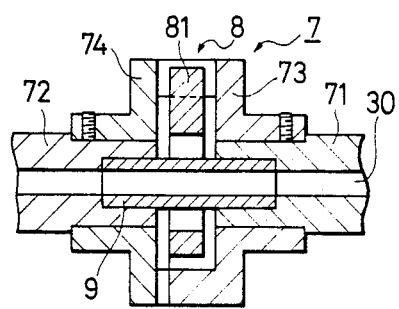
FIG. 4A is a side cross-sectional view taken along a line IV—IV in FIG. 3.
Figure 4B:
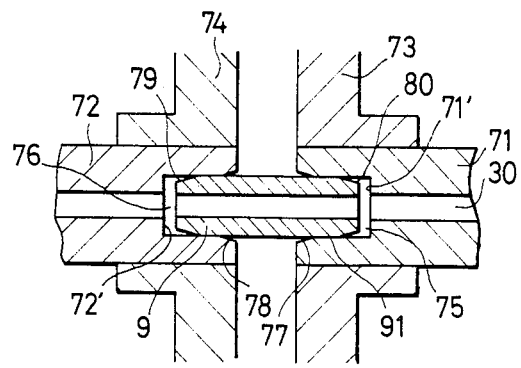
FIG. 4B is an enlarged detailed diagram of a connecting portion.

FIG. 3 is a longitudinal cross-sectional view showing a fluid coupling device constructed according to the present invention. FIG. 4A is a side cross-sectional view taken along a line IV—IV in FIG. 3, and FIG. 4B is an enlarged detailed diagram showing a fluid coupling device 7 of the invention connecting two shafts 71 and 72, each having a longitudinal hole or passage 30 formed therein. Reference numerals 73 and 74 designate joint flanges fixed to the shafts 71 and 72, respectively; 73a and 73b, reception faces projecting from the flange 73; 74a and 74b, reception faces projecting from the flange 74; 8, a buffer body made of an elastic material such as rubber; and 81, a buffer portion disposed between the reception faces. A tubular elastic member 9 is inserted between the shafts 71 and 72. Sealing is performed at a portion 91 between the outer circumference of the tubular elastic member 9 and the respective inner circumferences of recessed portions 71' and 72' at the respective opposite end portions of the shafts 71 and 72 (see FIG. 4B).

In this sealing arrangement, there is an interference of about 0.05 to 0.1 mm. Gaps 75 and 76 are spaced with lengths determined in consideration of factors such as an elongation of the tubular elastic member 9 in the axial direction. Chamferings 77, 78, 79, and 80 are formed in the inner circumferences of the respective shaft ends and at the opposite end portions of the tubular elastic member 9 in order to facilitate insertion of the tubular elastic member 9.

Figure 5:
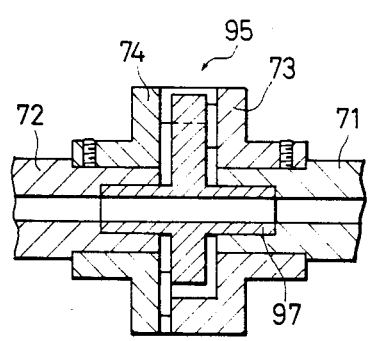
FIG. 5 is a side cross-sectional view of another embodiment of a fluid coupling device of the invention.
Figure 6:
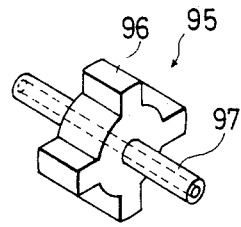

FIG. 5 is a side cross-sectional view of another embodiment in which a buffer body and a tubular elastic member are integrated, and FIG. 6 is a perspective view showing the integrated buffer body. The integrated buffer body 95 is constituted by a buffer portion 96 disposed between reception faces of flanges and a tubular portion 97 integrally formed with the buffer portion 96 and inserted between shafts.

Figure 7:
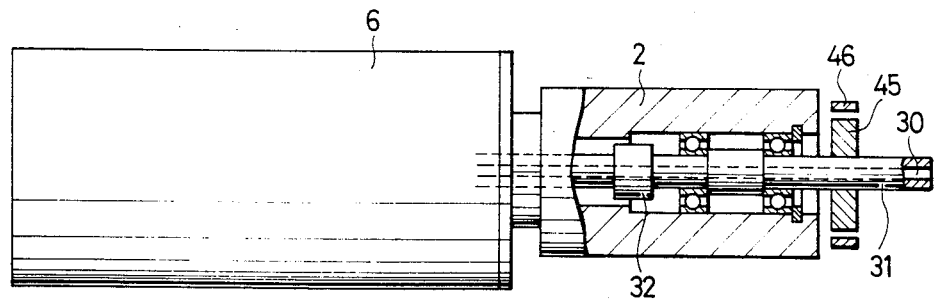
FIG. 7 is a diagram showing an example of a bobbin holder device having another arrangement.

FIG. 7 shows a modified embodiment of such a bobbin holder device in which a driving shaft 31 having a hole 30 and which is used for driving a bobbin 6 is provided with a brake drum 45 and a brake shoe 46.

Although sealing is performed between the inner circumferences of the respective shafts 71 and 72 and the outer circumference of the tubular elastic member 9 in the above-described embodiments of the present invention, it is possible to form a seal between the end surfaces of the recessed portions 71' and 72' at the ends of the respective shafts 71 and 72, and the end surface of the tubular elastic member 9.

With the arrangement as described above, according to the present invention, a fluid coupling device, such as may be employed to advantage in a bobbin holder device, having a simple structure but which conducts fluid between two shafts while maintaining a good airtight seal so that pressurized air can be conducted through a hollow shaft without damage to adjacent bearings.

We claim:

1. A thread bobbin holder device comprising: a bobbin holder body having a bobbin fitted on an outer circumference thereof through a bobbin holing member; a piston provided inside said bobbin holder body for controlling an amount of tension between said bobbin and said bobbin holding member; a holder shaft; a support body for rotatably supporting said bobbin holder body; a second shaft rotated by a driving source, a throughhole being formed in each of said holder shaft and said second shaft; a shaft joint for connecting said holder shaft and said second shaft; and a tubular elastic member disposed in said shaft joint and fitted into respective end portions of said holder shaft and said second shaft.

2. The thread bobbin holder device according to claim 1, wherein said shaft joint comprises a pair of flanges and an elastic buffer body sandwiched between said pair of flanges, said elastic buffer body and said tubular elastic member being formed integrally with each other.

3. The thread bobbin holder device according to claim 1, wherein both end portions of said tubular elastic member having chamferings.

4. The thread bobbin holder device according to claim 1, wherein said holder shaft and said second shaft having chamferings formed in inner circumferences at the respective opposite recessed end portions of said both shafts.

* * * * *